(12) United States Patent
Van Den Berg (10) Patent No.: US 10,519,804 B2
(45) Date of Patent: Dec. 31, 2019

(54) OIL CHAMBER WALL (71) Applicant: ROLLS-ROYCE plc, London (GB)

(72) Inventor: Merijn Alexander Brand Van Den Berg, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/492,393

(22) Filed: Apr. 20, 2017

(65) Prior Publication Data
US 2017/0314417 A1 Nov. 2, 2017

(30) Foreign Application Priority Data

Apr. 27, 2016 (GB) .................................. 1607308.2

(51) Int. Cl.
| | |
|---|---|
| F01D 25/18 | (2006.01) |
| F16C 33/66 | (2006.01) |
| F01D 25/16 | (2006.01) |
| F01D 25/20 | (2006.01) |
| F16C 37/00 | (2006.01) |
| F16N 7/36 | (2006.01) |
| F16N 39/00 | (2006.01) |

(52) U.S. Cl.
CPC ............ *F01D 25/18* (2013.01); *F01D 25/16* (2013.01); *F01D 25/20* (2013.01); *F16C 33/6685* (2013.01); *F16C 37/007* (2013.01); *F16N 7/36* (2013.01); *F16N 39/00* (2013.01); *F05D 2220/32* (2013.01); *F05D 2240/60* (2013.01); *F05D 2250/38* (2013.01); *F05D 2260/609* (2013.01); *F16C 2360/23* (2013.01)

(58) Field of Classification Search
CPC ............ F16C 33/6685; F16C 2360/23; F16C 37/007; F01D 25/18; F01D 25/183; F01D 25/16; F01D 25/162; F01D 25/164; F01D 25/20; F05D 2250/38; F05D 2260/609; F05D 2220/32; F16N 7/36; F16N 39/00
See application file for complete search history.

(56) References Cited

U.S. PATENT DOCUMENTS 4,265,334 A * 5/1981 Benhase, Jr. ........... F01D 25/18
                                                              184/6.11
4,370,106 A * 1/1983 Lauterbach ............. F01D 25/16
                                                              384/126

(Continued)

FOREIGN PATENT DOCUMENTS

GB        768240         2/1957

OTHER PUBLICATIONS

Great Britain Search Report dated Oct. 19, 2016 issued in GB Patent Application No. 1607308.2.

(Continued)

*Primary Examiner* — Alan B Waits
(74) *Attorney, Agent, or Firm* — Oliff PLC (57) ABSTRACT

An oil chamber wall arrangement is described as comprising: a chamber wall surrounding a rotor; a plurality of apertures defining through-holes for a flow of oil through the chamber wall, the apertures being defined by a pair of axially separated opposing walls and a pair of circumferentially opposing walls wherein the circumferentially opposing walls are separated by a midline which is radial to the rotational axis of the rotor and at least one of the pair of circumferentially opposing walls is not parallel to the radial midline.

21 Claims, 4 Drawing Sheets

(56) References Cited

U.S. PATENT DOCUMENTS

| | | | |
|---|---|---|---|
| 4,422,821 A | 12/1983 | Smith | |
| 4,468,066 A | 8/1984 | Alcorta et al. | |
| 4,479,682 A * | 10/1984 | Olivier | F16C 33/6681 |
| | | | 384/475 |
| 4,649,653 A | 3/1987 | Ameling | |
| 5,489,190 A | 2/1996 | Sullivan | |
| 5,749,660 A * | 5/1998 | Dusserre-Telmon | F16C 19/166 |
| | | | 384/475 |
| 6,261,003 B1 * | 7/2001 | Dusserre-Telmon | F16C 33/58 |
| | | | 384/475 |
| 7,244,096 B2 * | 7/2007 | Dins | F01D 25/20 |
| | | | 415/88 |
| 9,726,040 B2 * | 8/2017 | Gekht | F01D 25/18 |
| 2004/0037483 A1 * | 2/2004 | Beauvais | F01D 25/162 |
| | | | 384/548 |
| 2006/0002645 A1 | 1/2006 | Swainson | |
| 2007/0157596 A1 * | 7/2007 | Moniz | F01D 25/164 |
| | | | 60/39.162 |
| 2008/0029167 A1 * | 2/2008 | Eastwick | F01D 25/125 |
| | | | 137/561 A |
| 2013/0283758 A1 * | 10/2013 | Wotzak | F01D 25/18 |
| | | | 60/39.08 |
| 2016/0032771 A1 * | 2/2016 | Vdoviak, Jr. | F02C 7/06 |
| | | | 277/358 |
| 2016/0169041 A1 * | 6/2016 | Trohel | F01D 25/18 |
| | | | 415/230 |

OTHER PUBLICATIONS

EP Search Report dated Aug. 11, 2017 issued in EP Patent Application No. 17163498.

* cited by examiner

OIL CHAMBER WALL

CROSS-REFERENCE TO RELATED APPLICATIONS

This application is based upon and claims the benefit of priority from British Patent Application Number 1607308.2 filed 27 Apr. 2016, the entire contents of which are incorporated by reference.

BACKGROUND

1. Field of the Disclosure

The present disclosure relates to an oil chamber wall. In particular, the disclosure relates to a structural wall within a sealed oil chamber. The oil chamber may be used in a gas turbine engine.

2. Description of the Related Art

Figure 1:
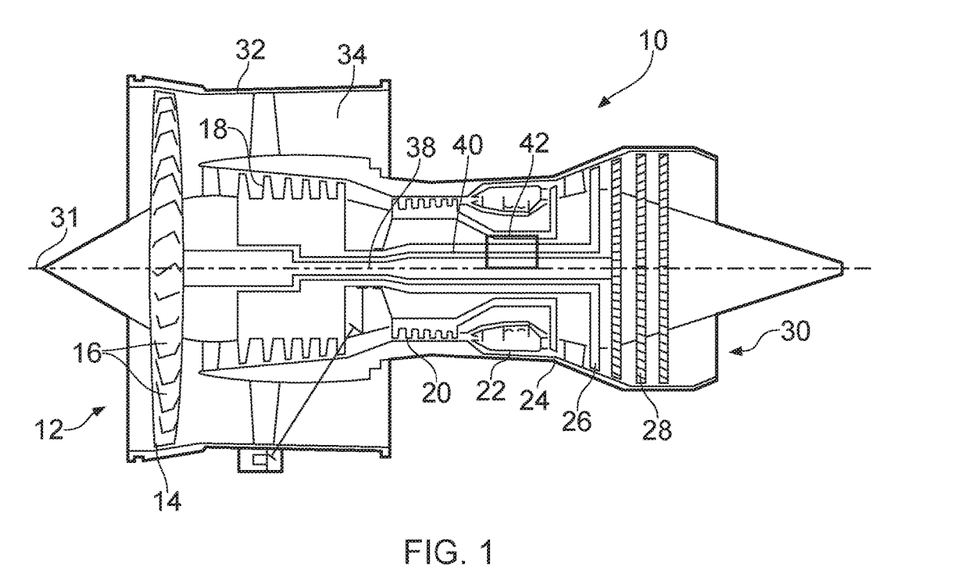
FIG. 1 shows a schematic longitudinal section of a conventional gas turbine engine.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 which are all rotatable about a principal axis of rotation 31, and an exhaust 19. The high pressure turbine 16 is arranged to drive the high pressure compressor 14 via a first shaft 20. The intermediate pressure turbine 17 is arranged to drive the intermediate pressure compressor 13 via a second shaft 21 and the low pressure turbine 18 is arranged to drive the fan 12 via a third shaft 22. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine and flows through a bypass duct 23 defined by a fan casing 24. The second portion of air leaving the bypass duct 23 flows through a bypass, or fan, nozzle 25 to provide propulsive thrust.

An important requirement within a gas turbine engine is to provide suitable lubrication to moving parts so as to prevent excessive wear and heat generation. One key area which requires a significant amount of lubrication is the bearings which provide the support for the aforementioned interconnecting shafts. Temperatures inside the bearing chamber of a gas turbine engine are typically very high. To prevent the engine overheating constant cooling is required which is provided by the flow of oil. However, oil will significantly degrade above 200° C. and it is important to maintain a steady and complete recirculation of oil to prevent a thermal accumulation and associated degradation within the bearing chamber.

Typically, a bearing is located within a bearing housing which has a through-flow of oil during operation to provide heat extraction and lubrication. The bearing chambers are connected to a recirculating oil system which cyclically scavengers hot oil, passes it through a cooling circuit and returns it to the bearing chamber. The present disclosure seeks to provide an oil chamber which can more reliably scavenge and recirculate oil to help prevent temperature related oil degradation.

OBJECTS AND SUMMARY

The present disclosure provides an oil chamber wall arrangement according to the appended claims.

An oil chamber wall arrangement may comprise: a chamber wall surrounding a rotor; a plurality of apertures defining through-holes for a flow of oil through the chamber wall, the apertures being defined by a pair of axially separated opposing walls and a pair of circumferentially opposing walls, wherein the circumferentially opposing walls are separated by a midline which is radial to the rotational axis of the rotor and at least one of the pair of circumferentially opposing walls is not parallel to the radial midline.

Providing non-radial circumferentially opposing walls to the oil flow apertures allows for an improved oil flow through the apertures and a reduction in the recirculation of oil.

The rotor may have a primary direction of rotation. The direction of rotation may provide a frame of reference for the circumferentially opposing walls in which a first circumferentially opposing wall is upstream in relation to the direction of rotation, and a second circumferential opposing wall is downstream in relation to the direction of rotation, and wherein the downstream wall is tangentially inclined to the radial in the downstream direction. The inclination of the wall in downstream direction results in the wall being more aligned with direction of rotation relative to the radial. The tangential inclination in the downstream direction may provide a separation between the radial mid-line and the downstream wall which increases along the radial mid-line from a radially inner surface of the chamber wall.

The inclination of the downstream wall may be between 10 and 45 degrees. In some examples, the angle of inclination may be between 15 and 35 degrees. In some yet further examples, the inclination may be between 20 and 30 degrees to the radial line of the rotor in a downstream direction.

The upstream wall may inclined to the radial of the rotor in a downstream direction. The inclination of the upstream wall may be between 0 and 45 degrees or between 0 and 25 degrees.

The tangential inclination of the upstream wall in the downstream direction may provide a separation between the mid-line and the downstream wall which decreases along the radial mid-line from a radially inner surface of the chamber wall.

The inclination of the upstream and downstream walls to the radial in the downstream direction may be approximately equal.

The circumferentially opposing walls may be spaced from the radial mid-line over the radial extent of the aperture.

The upstream and downstream walls may include multiple facets.

The downstream wall includes a first section and a second section. The first section is radially inwards of the second section and the downstream angle of inclination to the radial of the rotor for the second section may be greater than the downstream inclination of the first section.

The upstream wall may include a first section and a second section. The first section may be radially inwards of the second section and the downstream angle of inclination to the radial of the rotor for the first section may be greater than the downstream inclination of the second section.

The angle of the first section of the upstream wall may be between 0 and 45 degrees. The angle of the second section of the downstream wall may be between 30 and 55 degrees.

The first section of the upstream wall and the second section of the downstream wall may be inclined approximately similar amounts to the radial line in the downstream direction.

The oil chamber wall arrangement may comprise a plurality of circumferentially distributed apertures. The adjacent apertures may have a common wall therebetween, and the common wall may include lateral surfaces which define the circumferentially opposing walls of the apertures.

The circumferential transverse section of the common wall may be a trapezoid. The transverse section of the common wall may be an obtuse trapezoid. The circumferentially separated opposing walls of one of the apertures may be parallel.

The oil chamber may include one or more bearings and the rotor is a shaft. The bearings may be mounted to the support wall.

A combustion engine may include the oil chamber wall arrangement as described above.

The engine may be a gas turbine engine.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments will now be described by way of example only, with reference to the Figures, in which.

DETAILED DESCRIPTION OF EMBODIMENTS

Figure 2:
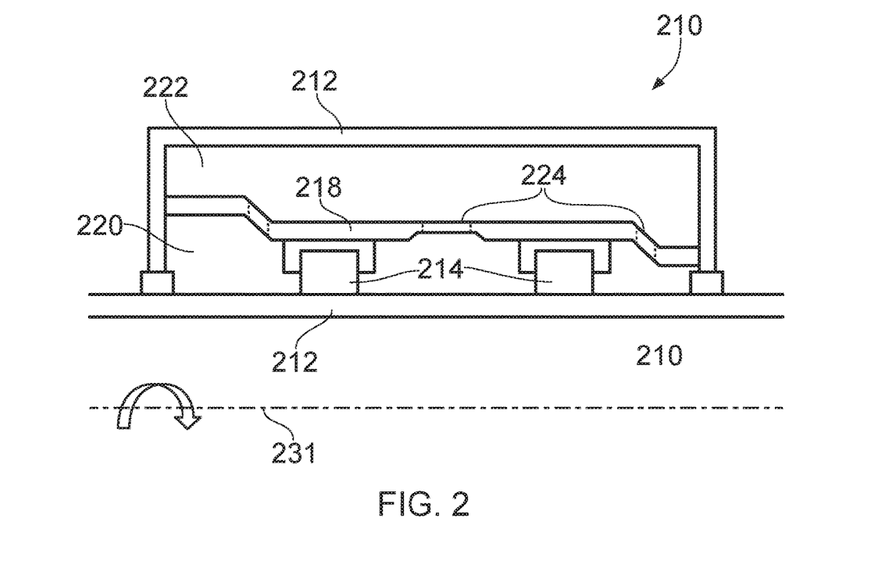
FIG. 2 shows an oil chamber in the form of a bearing chamber.

FIG. 2 shows a partial longitudinal section of a gas turbine engine. The partial section details an oil chamber 210 which is used to house some components requiring lubrication in service. In this embodiment, the oil chamber 210 is in the form of a bearing chamber having a bearing arrangement which provides radial support to a rotor in the form of an interconnecting shaft 212, as indicated in FIG. 1. In the example shown, there is a plurality of bearings 214 shown in a common bearing chamber, but there may be only a single or other numbers of bearings. The bearings are axially spaced along the shaft which is rotatable about the principal axis of the engine. The bearing chamber may service multiple shafts.

The oil chamber 210 includes an outer chamber wall 216 which provides a sealed volume in which the oil can be circulated. The bearing chamber houses the bearings 214 and one or more supporting wall 218 which provide radial and axial anchorage for the bearings 214. The bearing supports are typically located inside the oil wetted area of the bearing chamber. During operation, oil has to pass from an inner chamber 220 in which the bearings are located, through the support wall 218 to an outer chamber 222. The outer chamber 222 is provided by a separation between the support wall 218 and bearing chamber wall 212 and serves as a reservoir from which oil can be scavenged for cooling before being returned to the bearing chamber. The bearings 214 shown are roller bearings, but it will be appreciated that the disclosure is applicable to any bearing arrangement, such as ball or taper bearings etc. It will also be appreciated, that the oil chamber 210 need not be a bearing chamber but may be any chamber requiring one or more internal walls through which oil can pass. The support wall 218 may take the form of a sleeve which encircles the bearings and shaft. The support wall is typically stationary. The sleeve may be cylindrical. The support wall may have sections at various radii from the principal axis 231 of the engine. The bearing chamber may also include an oil scavenging system. The oil scavenging system takes oil from an outlet and passes it around a cooling circuit before reintroducing it to the bearing chamber. The scavenging system can be any known in the art. Typically, the outlet is located in a gravity filled sump in the lower half the gas turbine engine and is thus not shown here. Such scavenging systems are well known in the art.

In order for the oil to lubricate the bearings and pass from the inner chamber 220 to the outer chamber 222 for scavenging, the support wall 218 is provided with a number of windows or apertures 224 through which oil can flow from the inner chamber 220 to the outer chamber 222.

Figure 3:
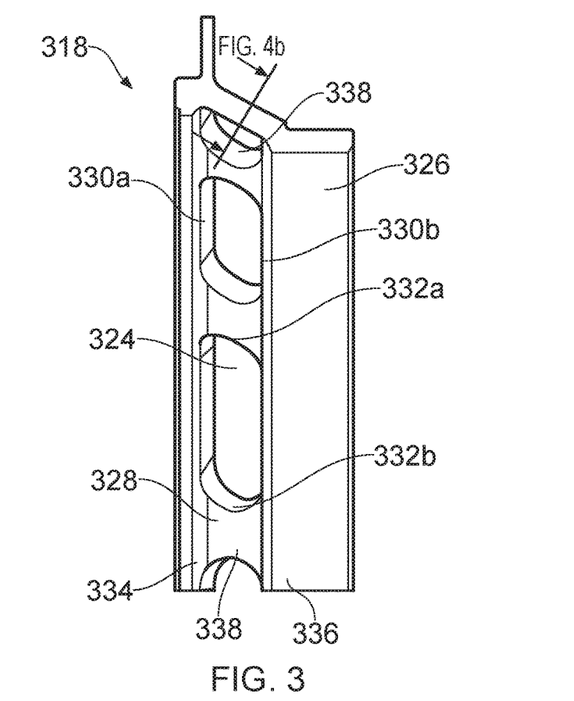
FIG. 3 shows a prior support wall.

A portion of a typical support wall is shown in FIG. 3. The support wall 318 has been axially truncated for the purpose of the drawing but it will be appreciated that it may extend both fore and aft, that is, to the left and right, of the figure. The support wall 318 is generally an annular structure which is concentrically mounted around the rotor. The wall 318 includes several axially extending wall portions, including an axial portion 326 having a constant radius along its length, and an inclined section 328. The inclined section 328 increases in radius from the axial portion 326 so as to provide a frustoconical wall portion which is concentric with the principal axis of the engine and the axial portion.

The inclined portion 328 includes a plurality of apertures 324 arranged in a circular array around the circumference of the inclined portion 328. It will be appreciated that the apertures 324 may be placed anywhere suitable along the length of the support wall 318. Further, although the apertures 324 are provided in a circular array about a single axial location, the apertures may be provided at different axial locations around the periphery of the chamber wall.

Each of the apertures is generally circumferentially elongate extending about an arc and includes a first pair of axially separated opposing walls 330a, b, and a second pair of circumferentially separated opposing walls 332a, b. The opposing walls face into and define the edges of the apertures.

In the example of FIG. 3, the axially opposing walls are straight 330a, b when viewed in perpendicular plan, whereas the circumferentially opposing walls 332a, b have a constant radius of curvature. However, it will be appreciated that either of the pairs of walls may be straight or curved. Further, the various wall portions may be joined a filleted radius. The various different configurations of aperture will be determined from the structural requirements of the supporting walls.

The circumferential band of apertures 324 is located between first 334 and second 336 axially separated wall portions of the support wall. In this instance, the first and second axially separated walls are provided by axial wall portions upstream and downstream of the inclined wall portion. A plurality of party or common members or walls 338 extend axially between the first 334 and second 336 wall portions to provide the circumferential edge walls of the apertures 324. The common members are named relative to the apertures 324 in that each wall is common to adjacent apertures.

The apertures 324 in the support wall 318 inevitably provide a weakness in the structural integrity of the support wall 318. This weakness is accounted for in the design of the support wall 318 which are, as a result, thicker than they would otherwise need to be. This design trade-off has been a tolerable design trade-off in the past. However, as gas turbine engines have advanced and become more power-dense, the rotors which are driven by the shafts and which are supported by the bearing chamber and support walls 318, have become heavier and rotate at higher speeds. This generally increases the loads which must be carried by the bearings and support wall, particularly when the bearings are required to accommodate an unbalanced rotor. Such an unbalancing can occur for numerous reasons. Thickening the support walls and further reducing the size of the apertures is one way to achieve an increased strength or load carrying capacity. However, the inventors have appreciated that increasing the thickness of the walls has led to deterioration in the oil circulation. This is believed to be down to oil colliding with and rebounding back into the inner chamber rather than being recirculated through the cooling system.

To manufacture a support wall 318 as shown in FIG. 3, a sleeve or tube of material is machined to the required shape before the apertures 324 are cut. The apertures 324 are cut by passing a cutting or a boring tool through the sleeve radially towards the central axis thereof. This results in the lateral circumferentially opposing walls 332a,b of the apertures 324 being parallel to one another.

Figure 4A:
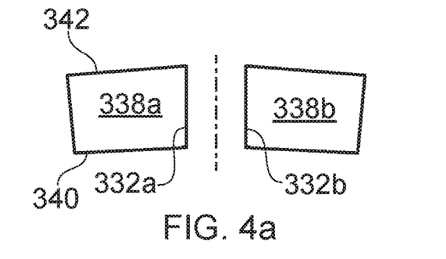
FIGS. 4(a) and 4(b) show a circumferential transverse section of an aperture defining common wall which forms part of a support wall.

FIG. 4a shows a transverse section through one of the common walls of the arrangement in FIG. 3. The transverse section shows the lateral edge walls 338 which correspond to the circumferential walls 338 of the apertures 324. The transverse section is taken on a circumferential plane which is perpendicular to the radially inner surface of the support wall. Thus, there is shown an aperture 324 defined by two common walls 338a, b one on either lateral side of an aperture. It will be appreciated that the common walls 338a,b are spaced closer together than would be the case in a typical support wall of this kind for the ease of explaining the arrangement. A more typical spacing can be seen in FIG. 4b.

The aperture 324 has an imaginary mid-line which extends radially inwards to the central axis of the sleeve which is coaxial with the principal axis of the rotor. The laterally opposing edge walls 332a,b of the apertures are parallel to each other and parallel to the radial mid line. This provides the common walls 338 with an isoceles trapezoidal transverse section. The isosceles trapezoid includes radially inner 340 and outer 342 walls which are joined by lateral walls 332a, b which extend in a generally radial direction. The inner radial wall 340 is circumferentially shorter than the outer radial wall 342 but parallel thereto. The two lateral walls 332a, b which provide the circumferentially opposing edge walls of adjacent apertures 324 are at a similar but opposite inclination with respect to the radial mid-line of each member to provide each wall with radial mid-line symmetry. As will be appreciated, the radially inner 340 and outer 342 walls may curved rather than straight as depicted in the Figure, so as to provide the curvature of the annular support wall 318. The support wall and oil chamber can be made from any suitable material and may be application specific. The support wall may be made from steel for example. In use, oil picks up rotational momentum from the contact with the rotor and moves radially outwards under centrifugal force towards the apertures 324. Some of the oil passes directly through the apertures but a significant portion of oil 344 will travel tangentially and impact the circumferential wall 332b of the apertures before passing through. As the oil hits the radially inner opening of an aperture 324 it does so with sufficient tangential momentum that it can be turned back into the inner chamber. Under some operating conditions, this rebounding flow can cause a significant recirculation within the inner chamber and an accumulation of repeatedly re-heated oil. Such an accumulation can result in a general degradation of the oil which results in increased wear and a possible fire hazard.

FIGS. 5 to 11 show transverse sections of different common walls arrangements. The first digit of the reference numerals correspond to the Figure number, and the second two digits correspond to similar features. Each of the common walls has at least one lateral edge inclined to the radial line of the support wall. The inclined walls provide preferable angles against which oil can contact and be encouraged to turn away from the inner chamber to the outer chamber. Thus, as can be seen from each of these Figures, there is at least one lateral wall which is non-parallel to the radial line and inclined thereto. The direction of the inclination is towards the tangential flow of the oil (as indicated by the arrow) and thus the direction of rotation of the rotor. Thus, the separation between the mid-line and the downstream wall may increase along the length of the mid-line from a radially inner surface of the chamber wall. This provides an aperture which is more in line with the flow of oil leaving the inner chamber. The circumferential walls are at a lower angle of incidence with the oil trajectory which reduces the chances of oil being returned back into the inner chamber.

Figure 5:
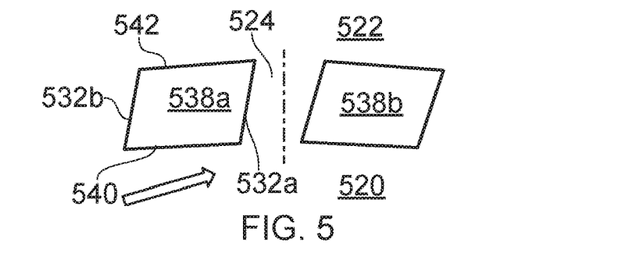
FIGS. 5 to 11 show various alternative examples of common walls.

FIG. 5 shows the transverse section of the common wall 538 in the form of a parallelogram having two pairs of parallel walls in which the opposing walls are of similar length. Thus, there is a radially outer wall 542, a radially inner wall 540, a first lateral wall 532a which provides a circumferentially opposing wall of a first aperture, and a second lateral wall 532b which provides the circumferential edge wall of a second aperture.

Figure 4B:
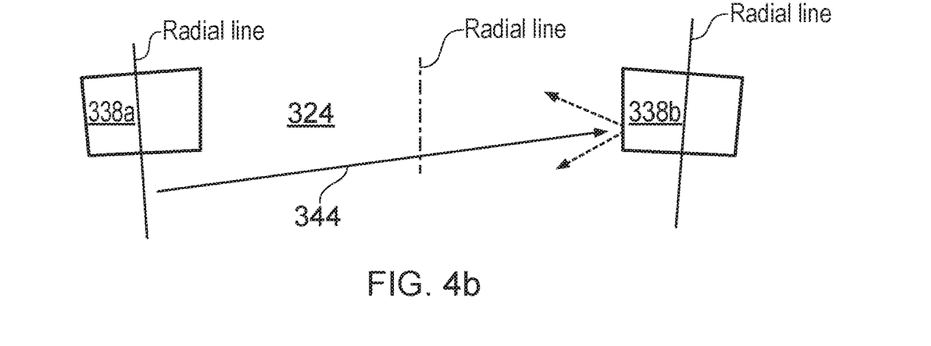

The aperture 524 is formed between the two circumferentially separated and adjacent common walls which are spaced further apart as per FIG. 4b. The circumferentially opposing walls are spaced from the radial mid-line over the radial extent of the aperture. Hence, the circumferentially opposing walls do not circumferentially overlap. Thus, the rotor is viewable from outside the oil chamber looking inwards along the radial mid-line. The aperture 524 comprises a through passage in which the circumferentially opposing walls are inclined to the radial line which extends from the rotational axis of the rotor (not shown), providing an aperture which is skewed or inclined to the radial in a tangential direction.

The angle of inclination may be chosen in an iterative manner so as to provide the optimum angle for reduced return flow into the inner chamber 520. The outer chamber is indicated by 522. The optimisation of the passage angling may be achieved using a suitable software package.

Because the common walls are parallelograms in which the radially inner surface and major axis lie tangentially to the central axis of the support wall, the degree of inclination of the opposing aperture edge walls is slightly different and the aperture is slightly narrower at the radially inner wall 540 opening than at the radially outer wall opening. Thus, the aperture 524 is slightly divergent in the radially outwards direction.

Figure 6:
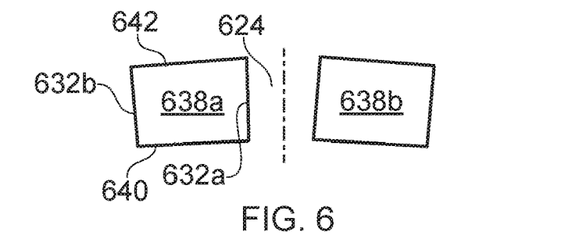
Figure 7:
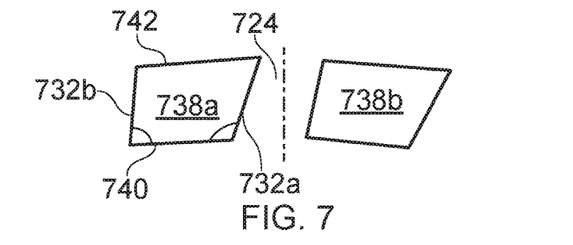

FIG. 6 shows a pair of adjacent common walls 624 having a transverse section of rectangular shape in which there are two opposing pairs of parallel walls having similar length with all of the walls being set perpendicular to its adjoining neighbour. The radially inner wall 640 and radially outer wall 642 are longer in length than the lateral walls 632*a,b* so that the major axis lies circumferentially and tangentially with respect to the rotor. Here, the circumferentially opposing walls 632*a,b* of the apertures 624 each lie at a similar but opposite inclination to the radial line so as to have a mid-span line of symmetry. As with the parallelogram sections of FIG. 5, the radially outer wall 642 opening is larger than the radially inner 640 opening which provides a slightly divergent aperture 624 which opens radially outwards. FIG. 7 shows common walls 738*a,b* which are obtuse trapezoidal in transverse section. At least one of the lateral walls 732*a,b* extending from a radial surface 742,740 is at an obtuse angle thereto, whilst the opposing lateral (the other of 732*a,b*) wall is at an acute angle to the same radial wall 742,740. This provides the aperture with a convergent profile when considered in a radially outwards direction, but one in which the wall facing the flow is inclined tangentially.

Figure 8:
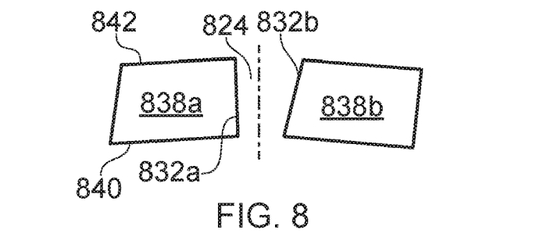
Figure 9:
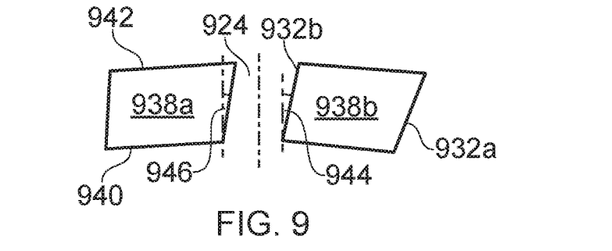

FIG. 8 shows a common wall having a right-angled trapezoid section in which one of the lateral walls 832*a* is perpendicular to the radially inner 840 and radially outer 842 walls (or tangent thereof), whilst the other lateral wall is inclined away from the radial direction to provide a divergent flow passage. The inclination is such that the radial outer opening of the aperture is larger than the radially inner opening. FIG. 9 shows a special case of the obtuse trapezoid of FIG. 7. Here, the opposing lateral walls 932*a*, 932*b* of the aperture are parallel to one another, but non-parallel to the radial line which extends to the rotational axis of the rotor. Hence, the width of the aperture 924 is constant along the radial extent and tangentially inclined to the radial. The radially outer wall 942 is circumferentially longer than the radially inner wall 940.

In FIGS. 5 to 11, the circumferentially opposing walls may be referred to as upstream X32*a*, and downstream X32*b* in relation to the circumferential flow of oil which leaves the rotor. Thus, the tangential component of the oil flow extends from the upstream side to the downstream side and impacts the downstream circumferential wall of the aperture X24.

As shown in FIG. 9 but applicable to all, the downstream and upstream walls 932*b* are inclined 944 to the radial line of the rotor. The downstream wall is inclined in a downstream direction such that the wall and aperture between the circumferential wall is more aligned with the direction of travel of the rotor and flow of oil leaving the rotor. The upstream wall may be inclined in a downstream direction as per FIGS. 5, 7 and 9, or be inclined away from the radial line in an upstream direction as shown in FIGS. 6 and 8. The degree of inclination may be the same or different for each of the walls. The inclination of the downstream wall may be between 10 and 45 degrees. Preferably, the inclination will be between 15 and 35 degrees. The inclination of the upstream wall may be between 0 and 45 degrees. Preferably, the inclination of the upstream wall may be between 0 and 25 degrees.

Figure 10:
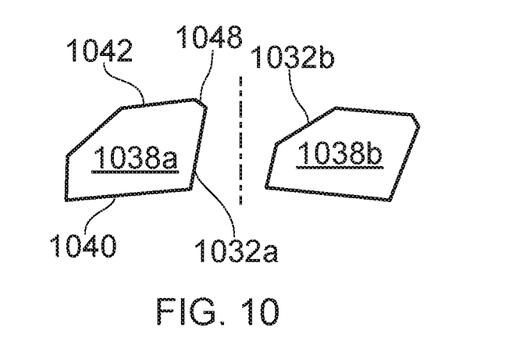

All of the angles of inclination are taken to be relative to the radial line. The angle of inclination of the upstream wall is the internal angle 946 between the downstream wall and radial line at the inner radial edge of the upstream wall. The angle of inclination of the downstream wall is the external angle 944 between the downstream wall and radial line at the inner radial edge of the downstream wall. FIG. 10 shows an arrangement similar to that of FIG. 5 with the inclusion of a chamfered (straight or curved) edge 1048 on the radially outer upstream edge of the aperture circumferential wall. The chamfer on this edge reduces the potential for stress related flaws in the design. The chamfered edge may be applied to any of the edges on the examples shown in FIGS. 5 to 11 but is preferably on an acutely angled edge.

A further chamfer is placed on the radially outer portion of the downstream circumferentially opposing wall 1032*b* to provide the downstream wall with a plurality of facets. The plurality of facets is made up of a first section which extends from the radially inner wall of the support wall, and a second section which extends from the first section to the radially outer surface of the support wall. It is envisaged that there may be further sections of wall.

Multiple facets allow the radially outer opening of the aperture to be increased relative to a throat of the aperture. The second section is more tangentially inclined than the first section. The angle of the surface of the second section may be between 35 and 55 degrees to the radial of the rotor. The first section may be between 0 and 45 degrees. The radial extent of the first section (and any subsequent sections) may be provided as appropriate for the structural and stress requirements of the common wall. The radial extent of the first and sections shown in FIG. 10 is approximately equal. The chamfer on the downstream wall of the aperture is larger than the stress relieving chamfer on the upstream wall.

Figure 11:
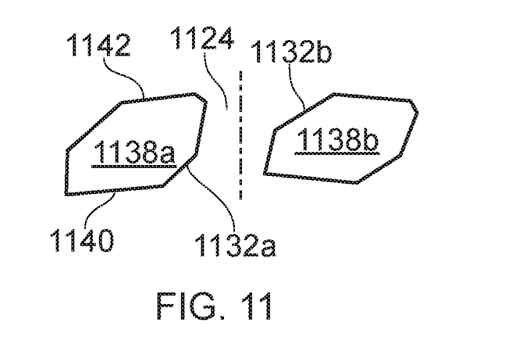

FIG. 11 shows an adaption of FIG. 10 in which the upstream wall 1132*b* of the circumferentially opposing wall of the aperture 1124 includes a plurality of facets. The plurality of facets is made up of a first section which extends from the radially inner wall of the support wall, and a second section which extends from the first to the radially outer or further portion. In the example of FIG. 11, the further portion is a chamfer as described in relation to FIG. 10. The plurality of facets allow the radially inner opening of the aperture to be increased relative to a throat of the aperture. The first section is more tangentially inclined than the second section. The angle of the first section of the upstream opposing wall of the aperture 1124 may be between and 30 and 55 degrees to the radial in a downstream direction. The second section may be between 0 and 35 degrees to the radial.

The radial extent of the more steeply inclined upstream and downstream wall sections in FIG. 10 are at an approximately similar angle, with the downstream inclined facet being larger. However, the radial extent of the facets may be the same on the upstream and downstream walls.

The multiple facets may be blended. That is, the multiple facets may be joined by a curved portion. The facets may also be curved.

It will be understood that the disclosure is not limited to the described examples and embodiments and various modifications and improvements can be made without departing from the concepts described herein and the scope of the claims. Except where mutually exclusive, any of the features may be employed separately or in combination with any other features in the disclosure extends to and includes all combinations and sub-combinations of one or more described features.

It will be appreciated that although the above support wall is described as being coaxial with a rotor and generally annular in the above description, this need not be the case.

Similarly, the oil chamber may be annular or otherwise. Further, although the support wall is shown as providing a static support for some rotor bearings, this need not be the case and the support wall may be any within an oil chamber.

I claim:

1. An oil chamber wall arrangement, comprising:
   a chamber wall surrounding a rotor; and
   a plurality of apertures defining through-holes for a flow of oil through the chamber wall, the apertures being defined by a pair of axially separated opposing walls and a pair of circumferentially opposing walls,
   wherein the circumferentially opposing walls each have a length, and the circumferentially opposing walls are separated from one another along the entire lengths of the circumferentially opposing walls by a radial line which is radial to the rotational axis of the rotor,
   wherein at least one of the pair of circumferentially opposing walls is not parallel to the radial line,
   wherein the rotor has a primary direction of rotation, the direction of rotation providing a frame of reference for the circumferentially opposing walls in which a first circumferentially opposing wall of the pair of circumferentially opposing walls is an upstream wall which is upstream in relation to the direction of rotation, and a second circumferential opposing wall of the pair of circumferentially opposing wall is a downstream wall which is downstream in relation to the direction of rotation, and wherein the downstream wall is tangentially inclined to a first radial line of the rotor in the downstream direction, and
   wherein the upstream and downstream walls include multiple facets.

2. The oil chamber wall arrangement as claimed in claim 1, wherein the downstream wall is inclined between 10 and 45 degrees to the first radial line of the rotor in the downstream direction.

3. The oil chamber wall arrangement as claimed in claim 2, wherein the inclination of the downstream wall is between 15 and 35 degrees to the first radial line of the rotor in the downstream direction.

4. The oil chamber wall arrangement as claimed in claim 2, wherein the upstream wall is inclined up to 45 degrees to a second radial line of the rotor in the downstream direction.

5. The oil chamber wall arrangement as claimed in claim 4, wherein the inclinations of the upstream wall and the downstream wall are equal.

6. The oil chamber wall arrangement as claimed in claim 4, wherein the inclination of the upstream wall is between 0 and 25 degrees.

7. The oil chamber wall arrangement as claimed in claim 1, wherein the downstream wall includes a first section and a second section, wherein the first section is radially inwards of the second section and the downstream angle of inclination to the first radial line for the second section is greater than the downstream inclination of the first section.

8. The oil chamber wall arrangement as claimed in claim 1, wherein the upstream wall includes a first section and a second section, wherein the first section is radially inwards of the second section and the downstream angle of inclination to the second radial for the first section is greater than the downstream inclination of the second section.

9. The oil chamber wall arrangement as claimed in claim 8, wherein the downstream wall includes a first section and a second section, wherein the first section is radially inwards of the second section and the downstream angle of inclination to the first radial line for the second section is greater than the downstream inclination of the first section and wherein the angle of the first section of the upstream wall to the second radial line is between 0 and 45 degrees, and the angle of the second section of the downstream wall to the first radial line is between 30 and 55 degrees.

10. The oil chamber wall arrangement as claimed in claim 9, wherein the first section of the upstream wall and the second section of the downstream wall are inclined a same amount to the respective first and second radial lines in the downstream direction.

11. The oil chamber wall arrangement as claimed in claim 10, wherein a circumferential transverse section of the common wall is a trapezoid.

12. The oil chamber wall arrangement as claimed in claim 1, wherein the plurality of apertures are circumferentially distributed, and wherein adjacent ones of the plurality of apertures have a common wall therebetween, and wherein the common wall includes lateral surfaces which define the circumferentially opposing walls of the apertures.

13. The oil chamber wall arrangement as claimed in claim 12, wherein a transverse section of the common wall is an obtuse trapezoid.

14. The oil chamber wall arrangement as claimed in claim 1, wherein the circumferentially opposing walls of one of the apertures are parallel.

15. The oil chamber wall arrangement as claimed in claim 1, wherein the oil chamber includes one or more bearings and the rotor is a shaft.

16. The oil chamber wall arrangement as claimed in claim 15, wherein the bearings are mounted to a support wall.

17. A combustion engine including the oil chamber wall arrangement as claimed in claim 1.

18. The combustion engine as claimed in claim 17, wherein the engine is a gas turbine engine.

19. An oil chamber wall arrangement, comprising:
   a chamber wall surrounding a rotor; and
   a plurality of apertures defining through-holes for a flow of oil through the chamber wall, the apertures being defined by a pair of axially separated opposing walls and a pair of circumferentially opposing walls,
   wherein the circumferentially opposing walls each have a length, and the circumferentially opposing walls are separated from one another along the entire lengths of the circumferentially opposing walls by a radial line which is radial to the rotational axis of the rotor,
   wherein at least one of the pair of circumferentially opposing walls is not parallel to the radial line,
   wherein the rotor has a primary direction of rotation, the direction of rotation providing a frame of reference for the circumferentially opposing walls in which a first circumferentially opposing wall of the pair of circumferentially opposing walls is an upstream wall which is upstream in relation to the direction of rotation, and a second circumferential opposing wall of the pair of circumferentially opposing walls is a downstream wall which is downstream in relation to the direction of rotation, and wherein the downstream wall is tangentially inclined to a first radial line of the rotor in the downstream direction, and
   wherein the downstream wall includes a first section and a second section, wherein the first section is radially inwards of the second section and the downstream angle of inclination to the first radial line for the second section is greater than the downstream inclination of the first section.

20. An oil chamber wall arrangement, comprising:

a chamber wall surrounding a rotor; and a plurality of apertures defining through-holes for a flow of oil through the chamber wall, the apertures being defined by a pair of axially separated opposing walls and a pair of circumferentially opposing walls, wherein the circumferentially opposing walls each have a length, and the circumferentially opposing walls are separated from one another along the entire lengths of the circumferentially opposing walls by a radial line which is radial to the rotational axis of the rotor, wherein at least one of the pair of circumferentially opposing walls is not parallel to the radial line, wherein the rotor has a primary direction of rotation, the direction of rotation providing a frame of reference for the circumferentially opposing walls in which a first circumferentially opposing wall of the pair of circumferentially opposing walls is an upstream wall which is upstream in relation to the direction of rotation, and a second circumferential opposing wall of the pair of circumferentially opposing walls is a downstream wall which is downstream in relation to the direction of rotation, and wherein the downstream wall is tangentially inclined to a first radial line of the rotor in the downstream direction, and wherein the upstream wall includes a first section and a second section, wherein the first section is radially inwards of the second section and the downstream angle of inclination to the second radial for the first section is greater than the downstream inclination of the second section.

21. The oil chamber wall arrangement as claimed in claim 20, wherein the downstream wall includes a first section and a second section, wherein the first section is radially inwards of the second section and the downstream angle of inclination to the first radial line for the second section is greater than the downstream inclination of the first section and wherein the angle of the first section of the upstream wall to the second radial line is between 0 and 45 degrees, and the angle of the second section of the downstream wall to the first radial line is between 30 and 55 degrees.

* * * * *